Figure 1:
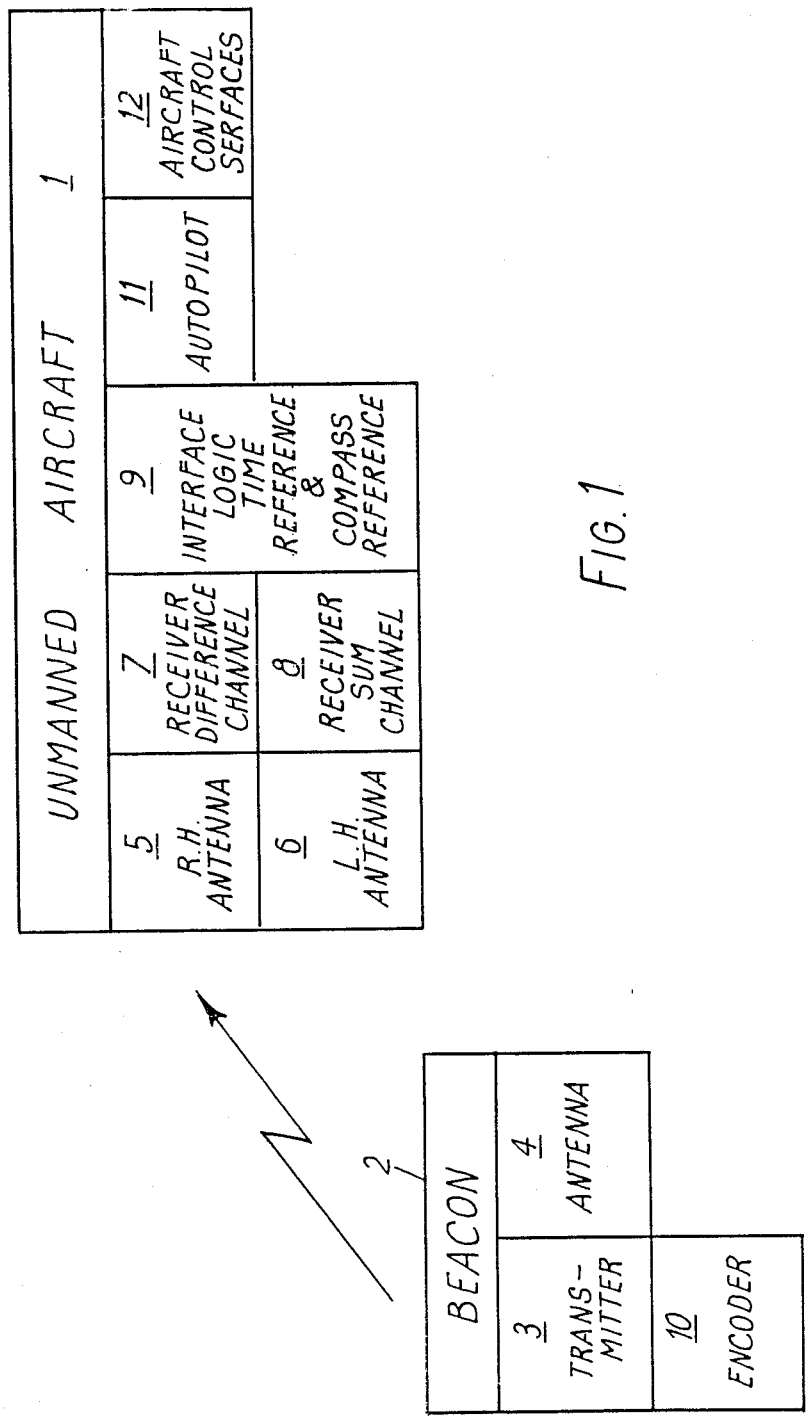

United States Patent [19]

Browning et al.

[11] Patent Number: 4,875,646

[45] Date of Patent: Oct. 24, 1989

[54] AIRCRAFT NAVIGATION SYSTEMS

[75] Inventors: Nigel Browning, Uckfield; Arthur C. Fry, Woking; Robert L. H. Malpass, Ashford; Brian Matthews, Frimley Green; Michaels S. Peters, Finchampstead, all of England

[73] Assignee: British Aerospace Public Limited Company, London, England

[21] Appl. No.: 926,975

[22] Filed: Jul. 17, 1978

[30] Foreign Application Priority Data

Jul. 23, 1977 [GB] United Kingdom ............. 31044

[51] Int. Cl.⁴ ............................................. B64C 13/20
[52] U.S. Cl. ................................. 244/190; 244/3.1; 244/3.15; 324/423; 324/442; 324/458
[58] Field of Search .............. 244/189, 190, 3.14, 244/3.15, 3.19, 3.1; 343/112 D, 119; 342/423, 442, 458

[56] References Cited

U.S. PATENT DOCUMENTS

| 2,253,508 | 8/1941 | Crane et al. | 342/458 |
| 3,005,605 | 10/1961 | MacCready | 244/190 |
| 3,344,428 | 9/1967 | Dewey et al. | 342/458 |
| 3,474,405 | 10/1969 | Padberg | 367/136 |
| 3,569,923 | 3/1971 | Naubereit et al. | 367/136 |
| 3,859,598 | 1/1975 | McElwain et al. | 367/188 |
| 4,190,000 | 2/1980 | Shaull et al. | 102/427 |

OTHER PUBLICATIONS

The A.R.R.L. Antenna Book, American Radio Relay League, 1960, pp. 238-239.

Primary Examiner—Stephen C. Bentley
Attorney, Agent, or Firm—Cushman, Darby & Cushman

[57] ABSTRACT

A navigation system for an aircraft fitted with an autopilot, the system comprising at least one ground-based transmitter (2), receiver means (7,8) mounted in the aircraft and including two antenna (5,6) oriented such that their polar diagrams overlap and are inclined with respect to the fore-and-aft axis of the aircraft. The system also comprises means (7,8) for deriving from the signals received by the antenna (5,6) from the, or a selected, transmitter (2) an error signal indicative of the angular difference between the heading of the aircraft and the heading of the, or a selected, transmitter (2) relative to the aircraft and applicable to the autopilot (12) to align the heading of the aircraft with the heading of the, or a selected, transmitter (2), and for deriving a signal representative of the distance of the aircraft from the, or a selected, transmitter (2), and means (9) responsive to the distance signal and operable to initiate a turn maneuver of the aircraft such that the latter will continually fly back and forth over the, or a selected, transmitter (2).

17 Claims, 7 Drawing Sheets

AIRCRAFT NAVIGATION SYSTEMS

This invention relates to navigation systems for aircraft and has for its object to provide a simple, and therefore economic, yet effective system principally (but not exclusively) for an unmanned aircraft.

Known navigation systems for unmanned aircraft rely on line-of-sight or high grade navigation apparatus. The disadvantage of the latter is cost and the disadvantages of the former are those of range and the problems created during over-the-horizon operations, coupled with the necessity for each aircraft to be under constant control by an operator. Over-the-horizon operations require either airborne control or elevated ground control each of which increases the cost and vulnerability of the system.

According to one aspect of the present invention a navigation system for an aircraft fitted with an autopilot comprises at least one ground-based transmitter, receiver means mounted in the aircraft and including two antennae oriented such that their polar diagrams overlap and are inclined with respect to the fore-and-aft axis of the aircraft, means for deriving from the signals received by the antennae from the, or a selected, transmitter an error signal indicative of the angular difference between the heading of the aircraft and the heading of the, or a selected, transmitter relative to the aircraft and applicable to the autopilot to align the heading of the aircraft with the heading of the, or a selected, transmitter, and for deriving a signal representative of the distance of the aircraft from the, or a selected, transmitter, and means responsive to the distance signal and operable to initiate a turn manoeuvre of the aircraft such that the latter will continually fly back and forth over the, or a selected, transmitter.

The means for deriving the distance signal may be a summing device which sums the amplitudes of the signals received by the two antennae, signal strength being an indication of the distance between the aircraft and the transmitter in question, and the means responsive to the distance signal may be a threshold device which initiates a turn of the aircraft when the summed signal falls below a predetermined value. The output of the threshold device may be used to initiate an appropriate turn command signal to the autopilot, preferably to the exclusion of all other signals such as the error signal. Alternatively, the output of the threshold device may be used to start a timing mechanism, the latter initiating the turn signal after the elapse of a predetermined period. Conveniently, the turn signal is always of the same sense (left or right) resulting in a flight path of precessing figure-of-eight form centred on the transmitter.

Thus, according to the invention, an aircraft can lock onto a selected transmitter and then be navigated over an area centred on that transmitter to undertake what can be termed a tethered loiter mode of operation. The aircraft may be unmanned and employed in a reconnaissance role. The aircraft may be fitted with means responsive to the presence of vehicles or radar installations, for example, and fitted with weaponry with which to attack the latter when detected by the aircraft.

In the case of an unmanned aircraft, this has to be navigated to the area occupied by the transmitter about which the tethered loiter mode is to be effected and this initial navigation may be achieved by locating a plurality of transmitters along the desired flight path, the transmission areas of adjacent transmitters overlapping and with each transmitter having either the same or a different code and the aircraft having programmable means responsive to the code or codes. The aircraft is launched towards the first beacon and the aircraft is navigated thereover using the same technique as in the tethered loiter mode except that having flown over that beacon, whose code it was programmed to select, it then selects the code of the next beacon and flies in the approximate direction of this second transmitter when its direction coincides with a programmed compass bearing. This procedure is repeated until the transmitter is reached about which tethered loitering is to be effected. Should this transmitter be inoperative for any reason, the aircraft may drop a further transmitter for loitering purposes. Alternatively, the aircraft may be programmed to fly to a given area and then drop its own beacon for loitering purposes.

The or each transmitter may be in the form of a beacon and be deployed by a manned or unmanned aircraft or, more accurately, by covert means, for example placed by hand against predetermined coordinates. Each beacon has a transmitter which may be passive until interrogated by a predetermined signal from the aircraft to be navigated, a power supply for the beacon being rendered operative on impact with the ground or by other means such as a timer or acoustic switch. Furthermore, each beacon may be fitted with a destruction device which may be actuated a preset time after placement or drop of the beacon or in the event of interference by attempted examination or relocation. The destructive charge may be of such a magnitude as to provide also an anti-personnel function.

The orientation of a beacon is important and in order to achieve a desired orientation, particularly when dropped from the air, a beacon in accordance with another aspect of the present invention has a body portion with one end adapted for implanting into the ground and the other end carrying an antenna, stabilising means being arranged to be rendered operative on impact of the beacon with the ground. The antenna may be in the form of two dipoles at right angles to each other and aerodynamically shaped to assist in the proper orientation of the beacon during free fall. Preferably, each beacon has a low magnetic signature and may be capable of receiving information, immediately prior to being placed or dropped, in the form of encoded positional information, transmission key codes, etc.

Figure 2:
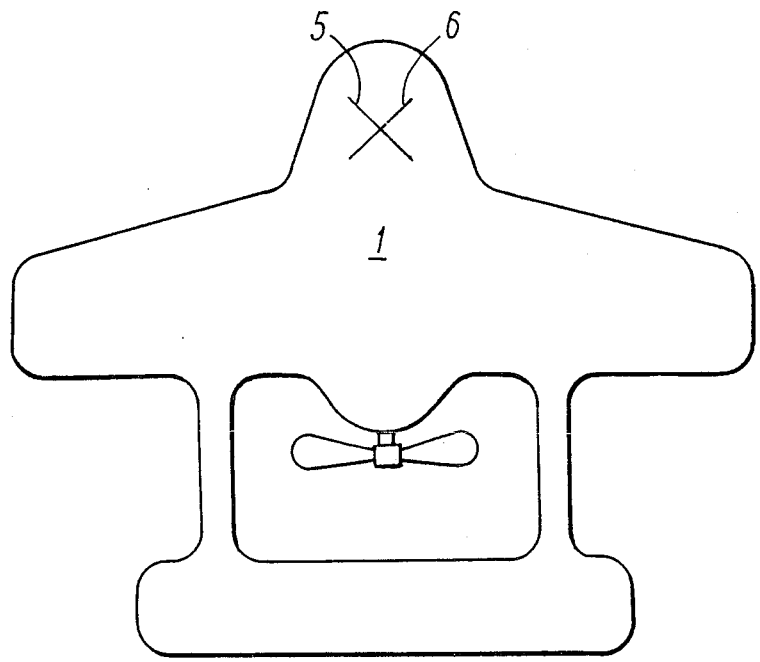
Figure 3:
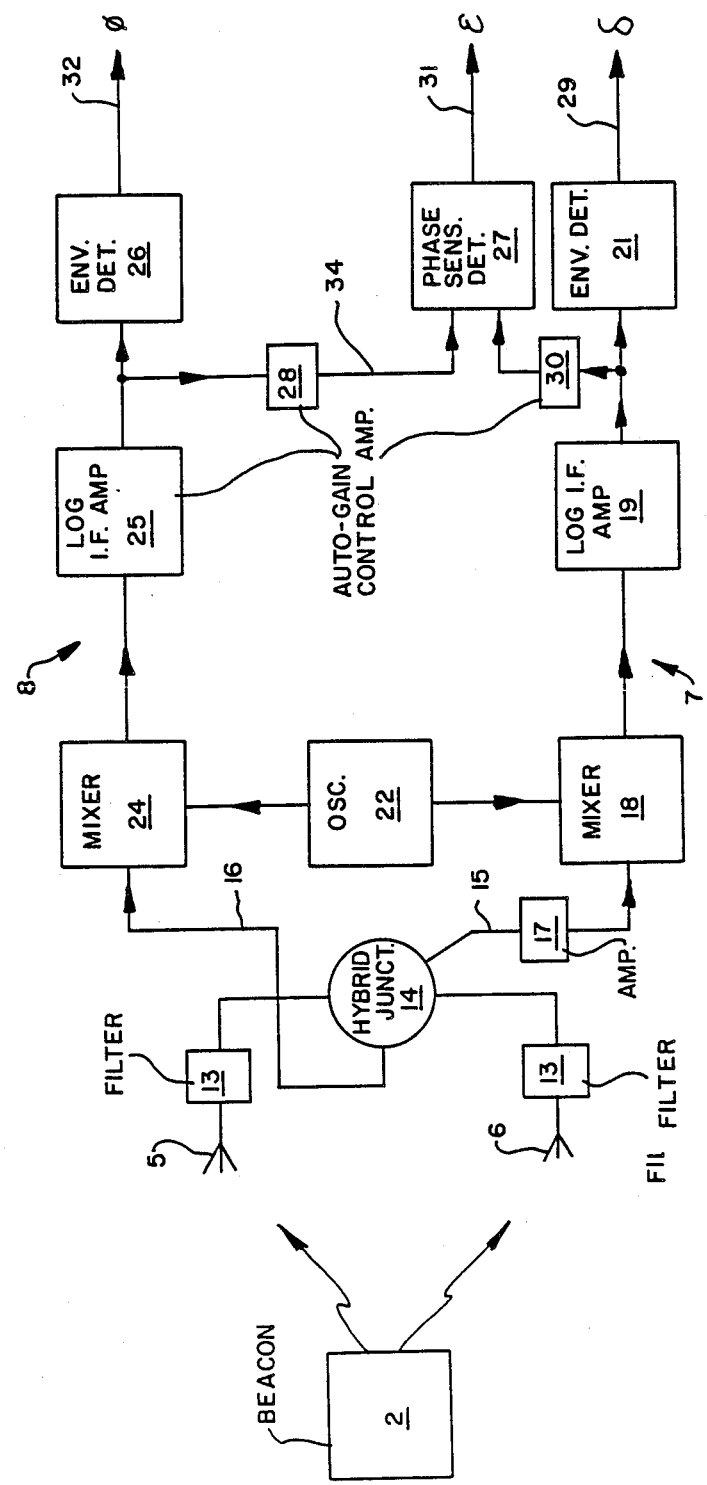
Figure 4:
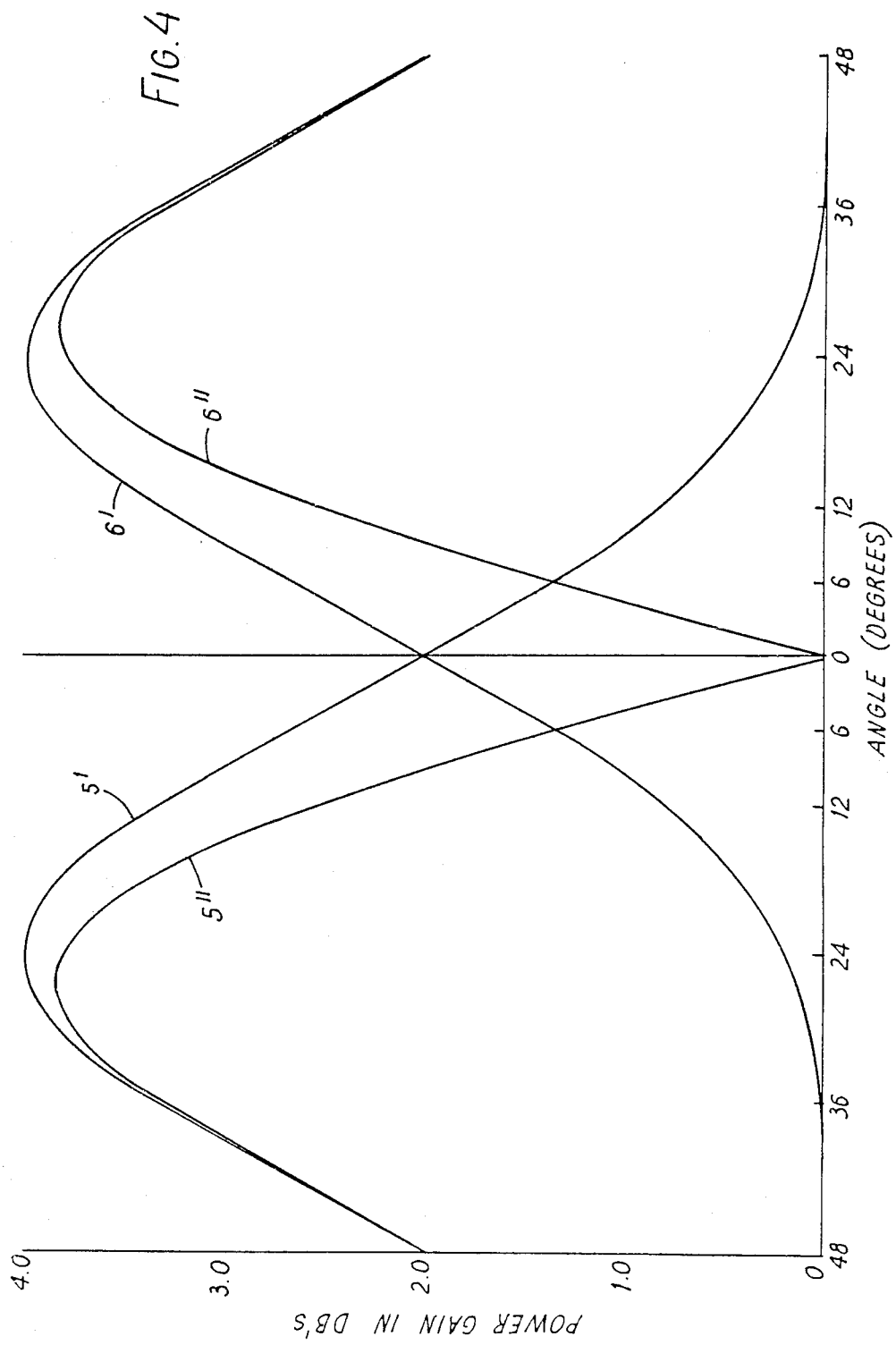
Figure 5:
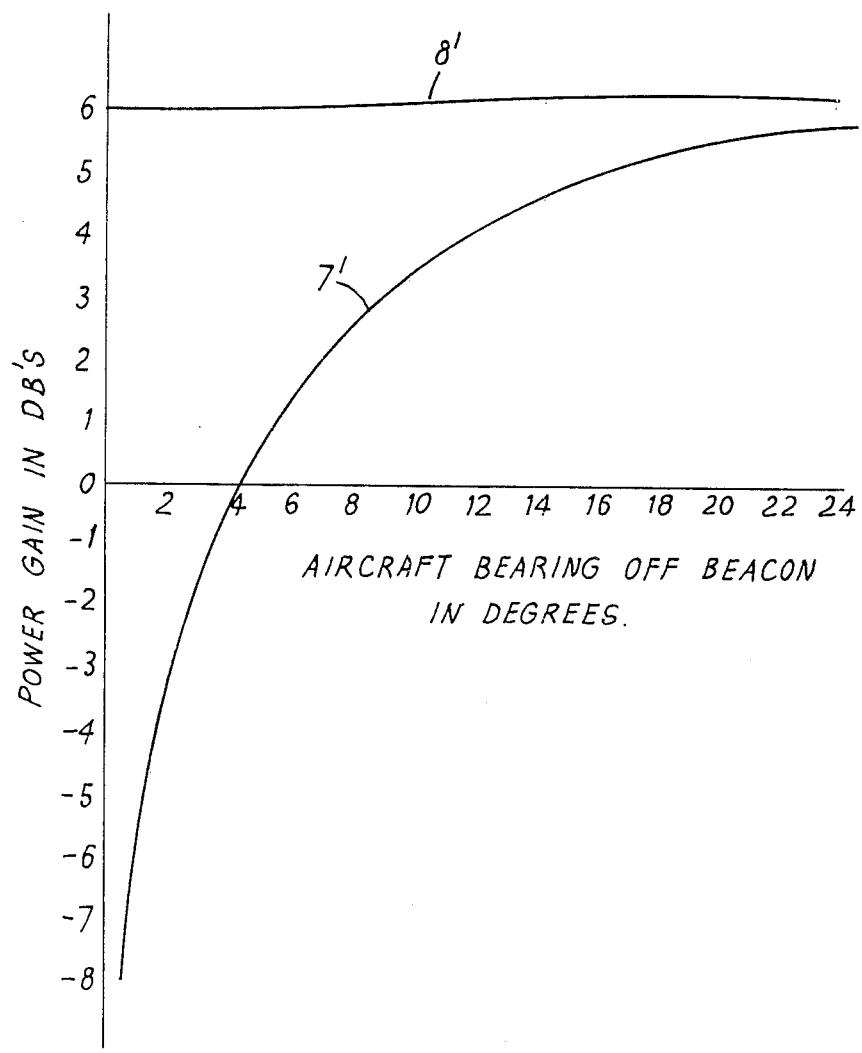
Figure 6:
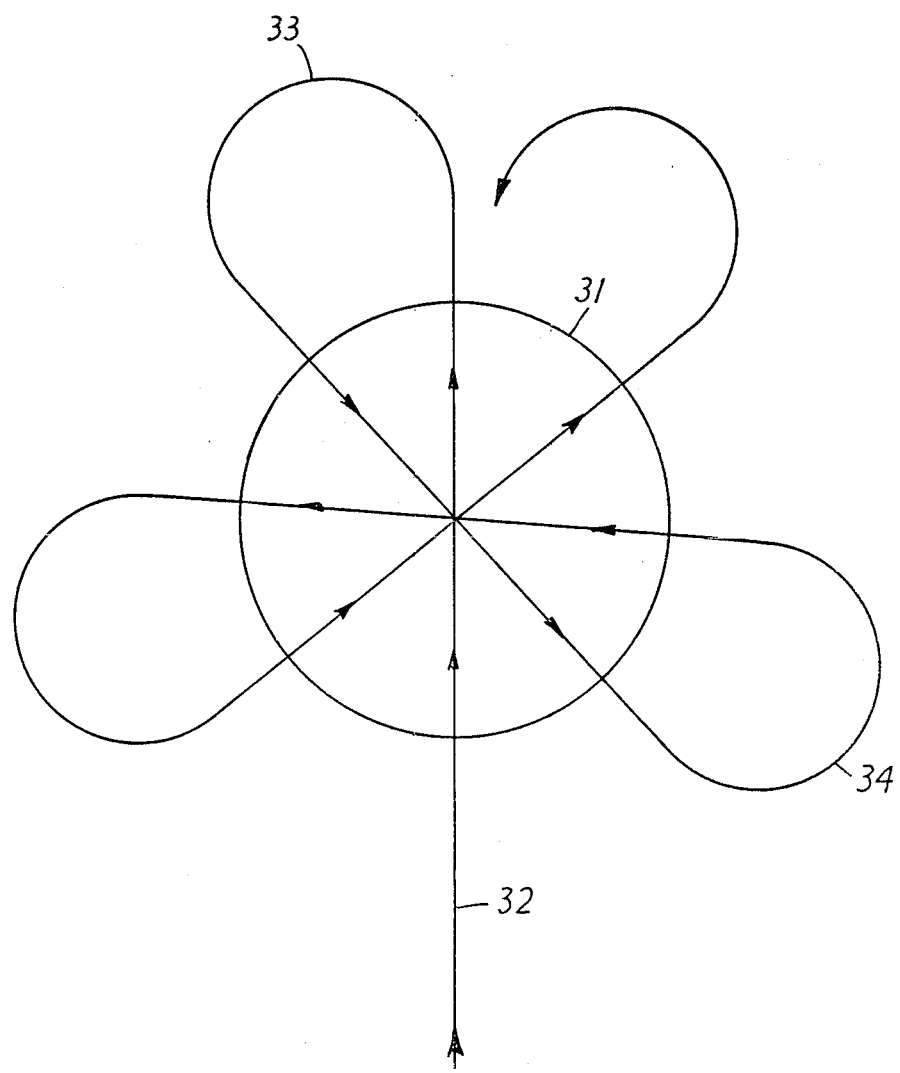
Figure 7:
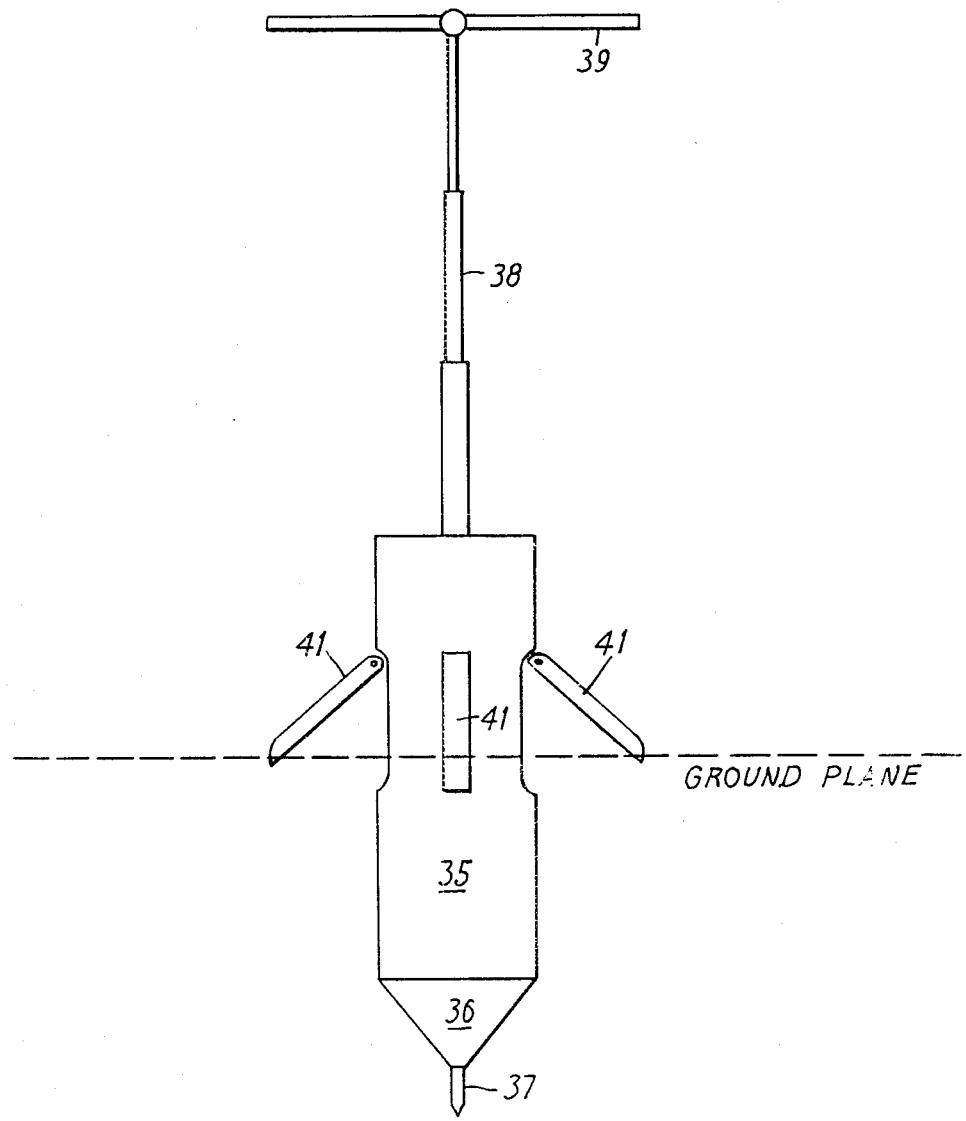

A navigation system for an aircraft in accordance with the present invention will now be described in greater detail, by way of example, with reference to the accompanying drawings, in which FIG. 1 is a block diagram of the overall system, FIG. 2 shows the location of antennae on the aircraft, FIG. 3 is a block diagram showing part of FIG. 1 in greater detail, FIGS. 4 and 5 are explanatory graphs, FIG. 6 shows the flight path pattern of an aircraft navigated in accordance with one mode of operation of the system, and FIG. 7 shows, diagrammatically, the form of a transmitter forming part of the system.

The illustrated system is designed for an unmanned aircraft which is indicated at 1 in FIG. 2. Referring to FIG. 1, the system comprises at least one transmitter in the form of a beacon 2 having an encoder 10, a transmitter 3 and an antenna 4. The system further comprises receiver means mounted in the aircraft 1 and including right-hand and left-hand antennae 5 and 6, a receiver difference channel 7, a receiver sum channel 8 and interface 9. The receiver means are connected to an autopilot 11 for the aircraft which controls the aircraft control surfaces 12 in conventional fashion. As shown in FIG. 2, the right-hand and left-hand antennae 5 and 6 are mounted in the nose of the aircraft and at an angle to the fore-and-aft axis of the latter such that the polar diagrams overlap and are inclined to said fore-and-aft axis. Each antenna 5 and 6 is a centre-fed dipole and is offset from the aircraft fore-and-aft axis by 45 degrees such that it is both forward and rearward looking.

FIG. 3 shows the receiver difference and sum channels 7 and 8 in greater detail. Each antenna 5 and 6 is connected to a filter 13 and thence to a hybrid junction 14 from which are derived a difference signal on line 15 and a summed signal on line 16. The line 15 is connected to the receiver difference channel 7 which comprises an RF amplifier 17, a mixer 18, a logarithmic IF amplifier 19 and an envelope detector 21. A local oscillator 22 is common to both the receiver difference and sum channels 7 and 8, the oscillator 22 being connected to the mixer 18 in the channel 7.

The receiver sum channel 8 comprises a mixer 24, an IF amplifier 25 and an envelope detector 26, with the oscillator 22 being connected as an input to the mixer 24. A phase-sensitive detector 27 receives as inputs the outputs from the logarithmic IF amplifiers 19 and 25 via automatic gain control amplifiers 28 and 30. The automatic gain control amplifiers 28 and 30 are included so that the power levels at the two inputs to the phase sensitive detector 27 are the same.

The receiver difference and sum channels 7 and 8 are in fact in the form of a conventional fixed tune superheterodyne receiver.

The output $\delta$ on line 29 of the receiver difference channel 7 provides a turn rate demand signal to the autopilot 11 and the output signal $\epsilon$ on line 31 from the phase sensitive detector 17 gives the sense or direction of the turn required. The output signal $\Phi$ on line 32 from the receiver sum channel 8 indicates received signal strength and this signal is fed to an adjustable threshold detector contained in the interface 9, the detector providing an output signal when the input signals drop below or above, as appropriate, predetermined levels, whereupon a constant rate of turn command signal is fed to the autopilot 11 and during the presence of that signal, the outputs from the receiver difference channel 7 and the phase sensitive detector 27 are inhibited.

The interface 9 includes a clock to provide a time reference and a compass reference which may be obtained from a flux gate. The interface 9 also includes a programmable missing pulse detector so that only preselected beacon codes can activate the system, the transmitter 3 of each beacon having a fixed frequency output which is pulsed and coded by varying pulse length and interpulse period.

FIG. 4 is a graph of gain against aircraft heading angle relative to a given beacon 2, lines 5' and 6' indicating the gain patterns of the two antennae 5 and 6, and the lines 5" and 6" indicating the error signal gain patterns. FIG. 5 is a graph of gain against aircraft heading relative to a given beacon 2 for the receiver difference and sum channels 7 and 8, line 7' indicating the former and line 8' the latter. It will be appreciated that when a given beacon is transmitting and being received by the antennae 5 and 6 the difference in amplitudes of the signals received at the respective antennae as detected by the receiver difference channel 7 indicates whether there is a discrepancy in the heading of the aircraft which is due to fly over the beacon. If there is no discrepancy, then a zero output signal $\delta$ results and no command is given to the autopilot 11. However, if there is a discrepancy then the output signal $\delta$ constitutes a command signal for the autopilot 11 and the phase-sensitive detector output signal $\epsilon$ gives the sense of that command signal and the autopilot effects the demanded change in aircraft heading through the control surfaces 12, this being a continuous process. If desired, the system can be arranged to take account of wind speed and direction.

A given beacon will have a specific transmission area which is indicated by the circle 31 in FIG. 6 and assuming the aircraft 2 is launched in a direction 32 towards the beacon it will be navigated over the latter as already described. As the aircraft moves away from the beacon the receiver sum channel 8 output signal $\Phi$ tends to decrease as the received signal strength decreases but will in fact remain approximately constant whilst the logarithmic IF amplifier 25 is operating within its limiting region. When this signal falls below the predetermined thresholds set by the adjustable threshold detector in the interface 9, the predetermined turn rate command signal is given to the autopilot 11 and the aircraft 1 will make a left-hand turn around the path 33 as seen in FIG. 6. Once the aircraft 1 re-enters the effective area 31 of the beacon, the system will again navigate the aircraft over the beacon until another turn rate command signal is initiated, whereby the aircraft will again make a left-hand turn as shown at 34 and this procedure will continue so that the aircraft will fly in a precessing figure-of-eight flight path as shown in FIG. 6 until recalled to base or deployed on another exercise. The received signal strength will fall as the aircraft 1 goes through nulls in the beacon radiation pattern; thus an automatic turn rate command would be initiated when not required. However lags within the system autopilot 11 and the aircraft response are sufficiently long so that the aircraft trajectory will not change significantly during the period that the aircraft is in the null. On leaving the null, the aircraft 1 will once again attempt to head directly towards or away from the beacon 2.

It will be seen from FIG. 6 that the aircraft 1 can be made to loiter over an area in excess of that of the beacon transmission area, basic variation in the loiter area being effected by adjustment of the adjustable threshold detector in the interface 9. Should it be desired to increase the loiter area beyond that possible using the adjustable threshold detector, a timing mechanism may be employed which inhibits the predetermined turn rate command signal for a predetermined period after it would have been initiated in normal circumstances by the adjustable threshold detector.

The aircraft may be fitted with means for detecting the presence of a radar installation or vehicle in the vicinity of the beacon over which it is operating in the tethered loiter mode and upon such detection it may then be commanded to destroy the sensed target with weaponry which it is carrying or act as a marker for other weapon systems. If the aircraft is undertaking a general reconnaissance role, the interface 9 may be programmed such that the aircraft operates in the tethered loiter mode over a first preselected beacon then moves on to a second preselected beacon and again operates in the tethered loiter mode and so on. The aircraft may have a telemetry link with the base station.

Normally, the first beacon over which the aircraft is to operate in the tethered loiter mode is some distance away from the base station, whereby it is preferable to aid the aircraft in locating that beacon since a launch in the general direction thereof may not be sufficient. To this end, a series of beacons 2 may be deployed along the desired route with overlapping transmission areas, each with the same or a different code and the interface 9 programmed such that the aircraft 1 will receive the transmission from the first beacon and be navigated thereover using the technique described above but without making a turn when the received signal strength falls below a predetermined level. Once clear of the first beacon, the aircraft will then be arranged to lock on to the next beacon and fly thereover, and so on until the beacon is reached over which the aircraft is to operate in the tethered loiter mode.

It should be noted that the navigation system only requires azimuth bearing information of a beacon 2 and does not necessarily have to fly directly over the beacon. It should also be noted that whilst the effective area of a beacon has been indicated by a circle 31 in FIG. 6, this is the ideal situation and it may be that the effective area is, in fact, an irregular shape due to obstructions, such as tall buildings, in the area but this in no way impairs the efficiency of the navigation system. If an obstruction decreases the received signal strength prematurely, the aircraft merely makes an early turn and there is no question of "losing" the beacon 2.

FIG. 7 shows one form which a beacon 2 may take. The beacon 2 has a generally cylindrical body 35 having a tapered end 36 fitted with a spike 37 which enables it to be implanted into the ground either by hand or resulting from a drop from an aircraft. The other end of the body 35 carries a mast 38 to which is fitted an antenna 39 in the form of two dipoles at right angles to each other and aerodynamically shaped to assist in the proper orientation of the beacon during free fall. A $\pi/2$ phase shifter (not shown) is included in the antenna feed to ensure that the two dipoles are fed in quadrature. The antenna 39 has an omnidirectional radiation pattern as for a small horizontal loop, the transmitted signals being horizontally polarised. The antenna 39 is connected to a conventional fixed frequency transmitter contained within the body 35, the output signal therefrom being pulsed and coded by varying pulse length and interpulse period as already mentioned. Fitted to the exterior of the body 35 and equispaced therearound are four stabilising feet 41 which are arranged automatically to move from a position in which they are generally flush with the surface of the body 35 to an operative position in which they extend from the body and engage the ground as shown in FIG. 7. The beacon 2 may be fitted with a destructive device (not shown) which may be activated a preset time after placement or drop or in the event of interference by way of examination or relocation. The destructive charge may be large enough to provide an anti-personnel function. The beacon 2 is small enough for it to be camouflaged so as to resemble, for example, an everyday object such as a can of soft drink. The beacon preferably has a low magnetic signature and to this end may have the body 35 made from a plastic or glass-reinforced plastic material.

The main operational constraint on the described system is the range at which the beacons 2 can be detected by the aircraft 1. This is itself critically dependent upon the beacon transmitter design and the antenna characteristics at low angles of incidence with the ground. Obviously this very much depends on the characteristics of the transmission area terrain (hill shapes, vegetation and buildings) and the actual immediate location and orientation of the beacon antenna 39, bearing in mind the beacon could be in a ditch or furrow, or badly tilted. The detection range will increase with the altitude of the aircraft 1 but it is desirable to keep its flight path as low as possible to reduce its vulnerability.

Detection range determines detection area. The larger this area, the greater is the error allowable on the launch range and bearing estimates. Also, the greater is the tolerance allowable in the systems that are used to take the aircraft 1 to a particular beacon and to return it to the beacon after carrying out a search excursion outside the detection range. Thus the distance from which the aircraft 1 can be launched at say a specific covertly placed beacon 2, the area covered by the aircraft in the tethered loiter mode and the altitude at which the aircraft can be flown are all determined essentially by the detection range of the beacons.

The choice of operating frequency for the system is mainly influenced by the constraints of antenna size, and environmental effects. Because of the need to achieve reasonable gains from a small antenna, frequencies below about 300 MHz can be discounted. The upper frequency limit is determined by environmental effects of which terrain screening is the most significant. A transmitter that is situated at ground level is likely to be severly affected by screening from trees, buildings etc., if such obstacles offer high attenuation at the carrier frequency. The attenuation of such obstacles is frequency dependent (for example the attenuation of a dry brick wall is about 2 dB at 400 MHz and 10 dB at 300 MHz) and favours the choice of low frequencies.

Horizontal polarisation is most suitable, since with vertical polarisation the antenna polar diagram is highly dependent upon ground constants and the low angle performance is difficult to predict.

The described navigation system is relatively simple and yet effective in maintaining an aircraft in a given area by operating the system in the tethered loiter mode. In addition, the system can be used to navigate the aircraft to the chosen area.

Variations in the navigation system described may be effected: for example, the receiver means in the aircraft 1 may be based on an interferometer array using phase comparison, as opposed to amplitude comparison.

We claim:

1. A navigation system for an aircraft fitted with an autopilot, the system comprising:
   at least one ground-based transmitter transmitting a first signal;
   receiver means for receiving the first signal, the receiver means being mounted in the aircraft and including two antennae oriented such that their polar diagrams overlap and are inclined with respect to the fore-and-aft axis of the aircraft;
   means for deriving an error signal and a distance signal from the signals generated by the antennae in response to the first signal from the transmitter, the error signal being indicative of an angular difference between a heading of the aircraft and a heading of the transmitter relative to the aircraft, the error signal also being applicable to the autopilot to align the heading of the aircraft with the heading of the transmitter, the distance signal being representative of a distance of the aircraft from the transmitter and being derived by a summing device which sums amplitudes of the signals generated by the two antennae, the amplitudes being an indication of the distance between the aircraft and the transmitter; and means responsive to the distance signal for initiating a turn maneuver of the aircraft such that the aircraft will continually fly back and forth over the transmitter, the turn-initiating means being a threshold device initiating a turn of the aircraft by generating a turn command signal to the autopilot when the distance signal falls below a predetermined value.

2. A system according to claim 1, wherein the threshold device is connected to a timing mechanism, the latter initiating a turn command signal after the lapse of a predetermined period following receipt of an output signal from the threshold device.

3. A system according to claim 1, wherein the turn command signal is always of the same sense, whereby the flight path of the aircraft is of precessing figure-or-eight form centred on the, or a, selected transmitter.

4. A system according to claim 1, and further comprising:

a plurality of ground-based transmitters located along a desired flight path of the aircraft with the transmission area of adjacent transmitters overlapping and with each transmitter having a code; and programmable means mounted in the aircraft and responsive to the coded signals from the plurality of transmitters, the aircraft being launched towards the first transmitter along the desired flight path and having been navigated in the direction of the transmitter using the transmitted coded signal thereof which the programmable means has been programmed to select, the aircraft then being navigated in the direction of a next transmitter, the airplane being navigated in the direction of each successive transmitter until the transmitter is reached over which the aircraft is to fly back and forth.

5. A system according to claim 4, wherein the plurality of transmitters have the same code.

6. A system according to claim 4, wherein the plurality of transmitters each have a different code.

7. A system according to claim 1 and further comprising programmable means programmed to navigate the aircraft to a predetermined location before being flown back and forth over the transmitter positioned at that location.

8. A system according to any of the preceding claims in the alternative wherein the or each transmitter comprise a body portion having an end adapted for implanting into the ground and the opposite end fitted with an antenna, and stabilising means arranged to be rendered operative on impact of the transmitter with the ground.

9. A system according to claim 8, wherein the stabilising means comprise a plurality of feet pivotally attached to the body of the transmitter and being inclined downwardly from the body when in the operative position.

10. A system according to claim 8, wherein the antenna of the or each transmitter is in the form of two dipoles at right angles to each other and aerodynamically shaped to assist in the proper orientation of the transmitter during free fall.

11. A system according to claim 8, wherein the or each transmitter has a low magnetic signature.

12. A system according to claim 8, wherein the or each transmitter further comprises means for receiving coded information.

13. A system according to claim 8, wherein the or each transmitter further comprises power supply means which are rendered operative on impact of the transmitter with the ground.

14. A system according to claim 8, wherein the or each transmitter further comprises power supply means which are rendered operative by a timing mechanism.

15. A system according to claim 8, wherein the or each transmitter further comprises power supply means which are rendered operative by an acoustic switch.

16. A navigation system for an aircraft fitted with an autopilot, the system comprising:

at least one ground-based transmitter transmitting a first signal;

receiver means for receiving the first signal, the receiver means being mountd in the aircraft and includidng two antennae oriented such that their polar diagrams overlap and are inclined with respect to the fore-and-aft axis of the aircraft;

means for deriving an error signal and a distance signal from signals generated by the antennae in response to the first signal from the transmitter, the error signal indicating an angular difference between a heading of the aircraft and a heading of the transmitter relative to the aircraft, the error signal also being applicable to the autopilot to align the heading of the aircraft with the heading of the transmitter, the distance signal representing a distance of the aircraft from the transmitter and being derived by a summing device which sums amplitudes of the signals generated by the two antennae, the amplitudes being an indication of the distance between the aircraft and the transmitter; and means responsive to the distance signal for initiating a turn maneuver of the aircraft such that the aircraft will continually fly back and forth over the transmitter, the turn initiating means comprising:

a threshold device which outputs an output signal when the distance signal falls below a predetermined threshold, and a timing mechanism which initiates a turn command signal a predetermined time after receipt of the output signal from the threshold device.

17. A navigation system for an aircraft fitted with an autopilot, the system comprising:

at least one ground-based transmitter transmitting a first signal;

receiver means for receiving the first signal, the receiver means being mounted in the aircraft and including two antennae oriented such that their polar diagrams overlap and are inclined with respect to the fore-and-aft axis of the aircraft;

means for deriving an error signal and a distance signal from signals generated by the antennae in response to the first signal from the transmitter, the error signal indicating an angular difference between a heading of the aircraft and a heading of the transmitter relative to the aircraft, the error signal also being applicable to the autopilot to align the heading of the aircraft with the heading of the transmitter, the distance signal representing a distance of the aircraft from the transmitter and being derived by a summing device which sums amplituds of the signals generated by the two antennae, the amplitudes being an indication of the distance between the aircraft and the transmitter; and means responsive to the distance signal for initiating a turn maneuver of the aircraft such that the aircraft will continually fly back and forth over the transmitter, the turn initiating means being a threshold device which initiates a turn of the aircraft when the distance signal falls below a predetermined threshold, the turn signal being always of the same sense so that the flight path of the aircraft is a precessing figure-eight centered over the transmitter.

* * * * *